April 17, 1928.  
J. P. GITS  
PNEUMATIC TIRE VALVE  
Filed Nov. 14, 1927
1,666,562
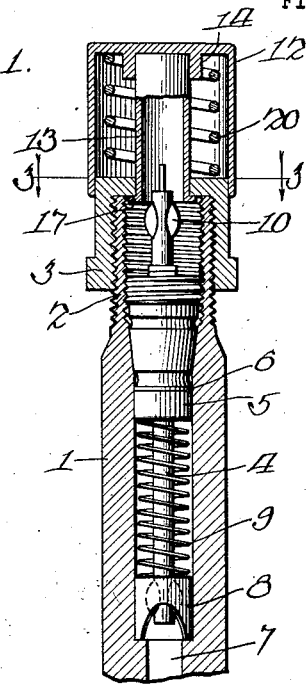
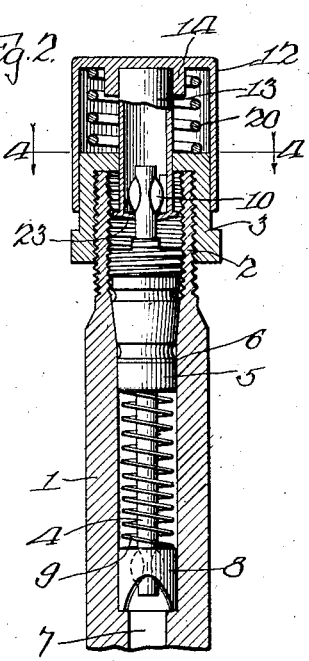
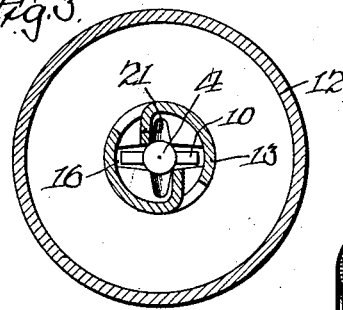
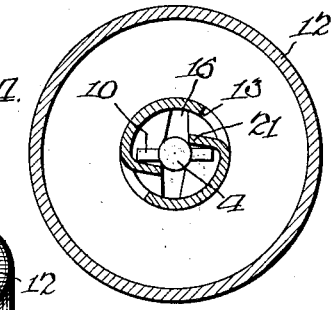
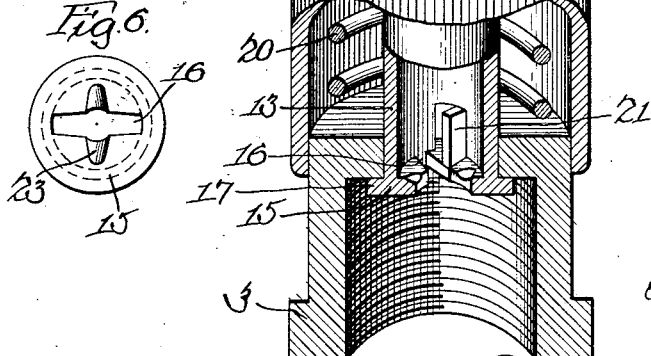
Inventor:  
Jules P. Gits  
By Jones, Addington, Ames & Seibold  
Attys.

Patented Apr. 17, 1928.

1,666,562

UNITED STATES PATENT OFFICE.

JULES P. GITS, OF CHICAGO, ILLINOIS.

PNEUMATIC-TIRE VALVE.

Application filed November 14, 1927. Serial No. 232,991.

My invention relates to certain new and useful improvements in valves and more particularly to a type of valve employed in a pneumatic inner tube of a vehicle tire wherein the valve is held against its seat by the pressure of air in the tube.

It has been heretofore customary to furnish such a valve in an inner tube and to rely solely on the air pressure to keep the valve seated. Theoretically the air in the inner tube should remain at the same pressure indefinitely if the valve remains tightly seated and there are no leaks. It is common experience, however, to find the air pressure constantly lowering, indicating that at some point the air is escaping. Such escape of the air is the result of the valve being jarred from its seat due to vibration of the vehicle. I am aware of the fact that others have suggested the employement of a positive lock for the valve whereby to hold the valve locked on its seat. Such suggestions, however, have been found, in practice, to be impractical as they involve the reconstruction of the valve casing, due to the fact that it is necessary to embody additional mechanism in the valve casing in order to accommodate the locking device.

The primary object of this invention is to provide an improved form of locking mechanism which may be embodied in the cap of the valve casing whereby the same may be adapted to the standard form of valve casing. According to the teachings of this invention, it is proposed to adapt the locking mechanism to the cap of the valve casing so that after the cap is threaded into position, means may be operated to grip the valve stem so as to hold the valve locked to its seat.

A further object of the invention is to provide a simple, inexpensive and practical form of locking mechanism which may be readily adapted to any standard form of pneumatic tire valve.

In order to apprise those skilled in the art how to construct and practice my invention, I shall now describe a preferred embodiment thereof taken in connection with the accompanying drawings which form a part hereof.

In the drawings:

Figure 1 is a vertical cross sectional view of a pneumatic tire valve embodying the invention;

Fig. 2 is a similar view but illustrating the valve locked to its seat;

Fig. 3 is a sectional view taken on line 3—3 of Fig. 1;

Fig. 4 is a sectional view taken on line 4—4 of Fig. 2;

Fig. 5 is a detail sectional view illustrating the manner in which the locking mechanism is associated with the cap; and Fig. 6 is a bottom plan view of a portion of the lock mechanism.

It will be understood that my invention is applicable to any form of valve. Referring more in detail to the accompanying drawing, I have illustrated a well known type of valve comprising the casing 1 having a threaded neck 2 for receiving the usual cap 3. A longitudinal movable valve stem 4 is disposed in casing 1 and carries the usual cushion valve 5 adapted to engage against seat 6 to close the internal passage 7 of casing 1. A cup 8 is furnished to provide means whereby the back pressure of the air in the inner tube will tend to hold valve 5 seated. A coil spring 9 is also provided to assist in holding the valve seated. Stem 4 extends upwardly and is furnished with a flared portion 10 which is normally the means by which the valve may be gripped for removing it from casing 1.

I contemplate furnishing an inverted cup-like member 12 adapted for sliding movement over the upper end of cap 3. A locking pin 13 is secured to the inside of member 12, preferably by a drive fit. Such connection may be secured by furnishing a downwardly extending boss 14 into which pin 13 may be tightly driven. This pin has its bottom 15 closed. A transverse slot 16, as shown in Fig. 6, into which the upper end of valve stem 4 is adapted to pass, is provided in bottom 15. Bottom 15 of locking pin 13 is slightly larger in diameter than that of the pin itself, whereby to furnish a flange 17 which functions to hold member 12 positioned on cap 3. A coil spring 20 within member 12 normally functions to keep member 12 in extended relation with respect to cap 3.

When it is desired to lock valve 5 to its seat 6, cap 3 is threaded into position as illustrated in Fig. 1. The operator then depresses member 12 until the upper end of stem 4 registers with and enters slot 16. Member 12 is further depressed until the enlarged portion 10 of valve stem 4 enters locking pin 13 whereupon a slight rotation of member 12 will rotate pin 13 until the enlarged portion 10 is out of register with slot 16. Continued rotation of locking pin 13 causes abutments 21 on the inside of pin 13 to engage the enlarged portion 10 of valve stem 4. Valve stem 4 being rotatable, it is, therefore, impossible to again bring the valve stem in alignment with slot 16 by a continued rotation of member 12. Therefore, it will be practically impossible accidentally to free the locking device herein disclosed by mere rotation of the cap 3 or the member 12.

I contemplate providing slight depressions 23 on the inside of face 15 of pin 13 so as to allow the enlarged portion 10 to drop into this depression, which in effect forms a diametrical groove. Such groove tends to prevent the valve stem 4 from slipping into a position where the enlarged portion 10 thereof registers with slot 16.

Coil spring 20 tends to urge member 12 upwardly so as to positively hold portion 10 within locking pin 13. I find that it is impossible by virtue of this arrangement accidentally to jar the upper end of the valve stem out of locking engagement with locking pin 13. Obviously, it will be apparent that valve 5 is securely held locked on its seat 6, being releasable only by reverse rotation of member 12 which rotates abutments 21 to move the enlarged portion 10 of valve stem 4 in register with transverse slot 16 in the bottom 15 of the pin 13. Thereupon, coil spring 20 will act to raise member 12 and locking pin 13 upwardly, as illustrated in Figs. 1 and 5, so as to release the valve stem and allow valve 5 to be depressed to open the valve passage 7 in the event it is desired to increase the air pressure in the inner tube.

From the foregoing description, it is apparent that the valve locking device may be embodied in the cap without modification or change in construction of the valve or its casing. It is merely attached to the cap and can be operated by depressing it after the cap has been threaded into position. It functions positively to hold the valve to its seat and cannot be jarred free by vibration. Abutment 21 and groove 23 retain the upper end of the valve stem in pin 13 and will release the valve stem only when the member 12 is rotated in one direction only.

Without further elaboration, the foregoing will so fully explain the gist of my invention, that others may, by applying current knowledge, readily adopt the same for use under varying conditions of service, without eliminating certain features, which may properly be said to constitute the essential items of novelty involved, which items are intended to be defined and secured to me by the following claims.

I claim:

1. A tire valve comprising a casing, valve mechanism positioned therein, a cap for said casing, and means associated with said cap for holding said valve locked on its seat.

2. A tire valve comprising a casing, valve mechanism therefor, a cap for said casing, and means for holding said valve locked on its seat, said means being operable after said cap is positioned on said casing.

3. An air valve comprising a casing, valve mechanism positioned therein, a cap for said casing, and means disposed in said cap for holding said valve locked in its seat.

4. A pneumatic tire valve comprising a casing, valve mechanism positioned therein, and a cap for closing said casing having provisions for gripping said valve to hold it locked on its seat.

5. A pneumatic tire valve comprising a casing, valve mechanism positioned therein, a cap for said casing, and depressible means operable after said cap is positioned for engaging and gripping said valve to hold it locked on its seat.

6. A pneumatic tire valve comprising a casing, a valve stem disposed in said casing, a cushioned valve carried by said valve stem, a cap for one end of said casing, and means associated with said cap for gripping said valve stem whereby to lock it against movement and to hold said valve locked on its seat.

7. A pneumatic tire valve comprising a casing, a valve stem disposed in said casing, a cushioned valve carried by said valve stem, a cap for said casing, a locking element carried by said cap and movable inwardly to engage the end of said valve stem, and spring means for urging said locking element outwardly whereby to hold said valve locked on its seat.

8. A pneumatic tire valve comprising a casing, a longitudinally movable valve stem in said casing, a valve carried by said valve stem, and a locking element which is movable along the axis of said valve stem for engaging one end thereof whereby to hold said valve locked on its seat.

9. A pneumatic tire valve comprising a casing provided with at least one end open, a cap for said open end, a valve stem in said casing, a valve on said valve stem, and spring pressed locking element on said cap normally urged away from said valve stem but depressible to engage the same and hold said valve locked to its seat.

10. A pneumatic tire valve comprising a casing provided with an open end, a cap therefor, a valve stem in said casing, a valve on said stem, a pin slidably carried with respect to said cap, said pin having an opening therein for the reception of one end of said valve stem, and means for holding said end of the valve stem in said pin opening whereby to hold said valve locked to its seat.

In witness whereof, I have hereunto subscribed my name.

JULES P. GITS.